US009182142B2

(12) United States Patent
Wen

(10) Patent No.: US 9,182,142 B2
(45) Date of Patent: Nov. 10, 2015

(54) METHOD FOR OPERATING AN HVAC SYSTEM

(71) Applicant: General Electric Company, Schenectady, NY (US)

(72) Inventor: Yicheng Wen, Louisville, KY (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 13/761,618

(22) Filed: Feb. 7, 2013

(65) Prior Publication Data

US 2014/0222219 A1    Aug. 7, 2014

(51) Int. Cl.

| G05D 23/00 | (2006.01) |
| G05B 21/00 | (2006.01) |
| G05B 13/00 | (2006.01) |
| G01M 1/38 | (2006.01) |
| G05B 15/00 | (2006.01) |
| F24F 11/00 | (2006.01) |

(52) U.S. Cl.
CPC ............ *F24F 11/006* (2013.01); *F24F 11/0012* (2013.01); *F24F 2011/0094* (2013.01)

(58) Field of Classification Search
CPC ................ F24F 11/006; F24F 11/0012; F24F 2011/0094
USPC .................................................. 700/275–276
See application file for complete search history.

(56) References Cited

U.S. PATENT DOCUMENTS

| 4,940,079 | A | * | 7/1990 | Best | F24D 19/1072 |
| | | | | | 165/236 |
| 6,439,469 | B1 | * | 8/2002 | Gruber | G05B 13/048 |
| | | | | | 236/78 D |
| 8,091,795 | B1 | | 1/2012 | McLellan et al. | |
| 8,224,495 | B2 | * | 7/2012 | Weaver | F01K 3/16 |
| | | | | | 137/828 |
| 8,543,244 | B2 | * | 9/2013 | Keeling | F24D 19/1066 |
| | | | | | 700/276 |
| 2012/0123594 | A1 | | 5/2012 | Finch et al. | |
| 2012/0245740 | A1 | * | 9/2012 | Raestik | G05B 13/027 |
| | | | | | 700/276 |
| 2012/0259469 | A1 | * | 10/2012 | Ward | G05D 23/1917 |
| | | | | | 700/276 |
| 2013/0179373 | A1 | * | 7/2013 | Mutchnik et al. | 705/412 |
| 2013/0226359 | A1 | * | 8/2013 | Ji et al. | 700/291 |
| 2014/0067132 | A1 | * | 3/2014 | Macek | F24F 11/006 |
| | | | | | 700/276 |
| 2014/0222219 | A1 | * | 8/2014 | Wen | F24F 11/0012 |
| | | | | | 700/278 |
| 2014/0365017 | A1 | * | 12/2014 | Hanna | F24F 11/001 |
| | | | | | 700/276 |
| 2015/0127164 | A1 | * | 5/2015 | Wang | G05B 15/02 |
| | | | | | 700/275 |
| 2015/0248118 | | * | 9/2015 | Li | G05B 13/04 |
| | | | | | 700/295 |

* cited by examiner

*Primary Examiner* — Ronald Hartman, Jr.
(74) *Attorney, Agent, or Firm* — Dority & Manning, P.A.

(57) ABSTRACT

A method for operating an HVAC system of a building is provided. The method includes providing a model for an indoor temperature of the building, a model for an operating cost of the HVAC system, and predicted future outdoor temperatures. Utilizing at least the models for the indoor temperature and the operating cost of the HVAC system and the predicted future outdoor temperatures, future operating states of the HVAC system can be calculated.

16 Claims, 3 Drawing Sheets

METHOD FOR OPERATING AN HVAC SYSTEM

FIELD OF THE INVENTION

The present subject matter relates generally to HVAC systems, such as residential or commercial HVAC systems, and methods for operating the same.

BACKGROUND OF THE INVENTION

Commercial and residential buildings or structures are commonly equipped with systems for regulating the temperature of air within the building for purposes of e.g., comfort, protection of temperature sensitive contents, etc. Sometimes referred to as heating, ventilating, and air conditioning or HVAC systems, such systems typically include one or more components for changing the temperature of air (i.e. air treatment components as used herein) along with one or more components for causing movement of air (i.e. blowers as used herein). For example, a refrigerant based heat pump may be provided for heating or cooling air. Alternatively, or in addition thereto, electrically resistant heat strips and/or gas burners may be provided for heating air. One or more blowers or fans may be provided for causing the heated or cooled air to circulate within the building in an effort to treat all or some controlled portion of air in the building. Ducting and vents may be used to help distribute and return air from different rooms or zones within the building.

During heating and/or cooling of air, HVAC systems consume energy. In particular, HVAC systems' energy consumption can account for more than fifty percent of a building's total energy consumption. Despite consuming large amounts of energy, HVAC systems are generally set to a specific operating temperature, and the HVAC systems operate to maintain an associated building at the specific operating temperature. Thus, the HVAC systems' operating costs are generally not considered when setting such HVAC systems. Further, it can be difficult for users to estimate their HVAC system's operating cost. In particular, it can be difficult for users to determine how their HVAC system's operating cost is affected by factors such as the operating temperature specified by the user or an outside temperature.

Accordingly, methods for operating HVAC systems that consider a price of operating the HVAC systems would be useful. In particular, methods for operating HVAC systems that can reduce a price of operating the HVAC systems would be useful.

BRIEF DESCRIPTION OF THE INVENTION

The present subject matter provides a method for operating an HVAC system of a building. The method includes providing a model for an indoor temperature of the building, a model for an operating cost of the HVAC system, and predicted future outdoor temperatures. Utilizing at least the model for the indoor temperature and the operating cost of the HVAC system and the predicted future outdoor temperatures, future operating states of the HVAC system can be calculated. Additional aspects and advantages of the invention will be set forth in part in the following description, or may be apparent from the description, or may be learned through practice of the invention.

In a first exemplary embodiment, a method for operating an HVAC system is provided. The HVAC system is configured for cooling air within a building, heating air within the building, or both. The method includes providing a model for an indoor temperature, y, of the building, providing a model for an operating cost, J, of the HVAC system, providing predicted future outdoor temperatures, and calculating future operating states of the HVAC system utilizing at least the model for y, the model for J, and the predicted future outdoor temperatures.

In a second exemplary embodiment, a method for predicting energy consumption of an HVAC system is provided. The HVAC system is configured for cooling air within a building, heating air within the building, or both. The method includes providing a model for an indoor temperature, $y_k$, of the building at time k based at least in part on an interior temperature, $y_{k-1}$, of the building at time k−1, an exterior temperature, $v_{k-1}$, of the building at time k−1, and an operating state, $u_{k-1}$, of the HVAC system at time k−1. The method also includes providing a model for an operating cost, J, of the HVAC system based at least in part on a utility cost, $J_e$, of the HVAC system, a comfort cost, $J_d$, of the HVAC system, and a state change cost, $J_p$, of HVAC system. The method further includes providing predicted future outdoor temperatures and calculating future operating states of the HVAC system utilizing at least the model for $y_k$, the model for J, and the predicted future outdoor temperatures.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
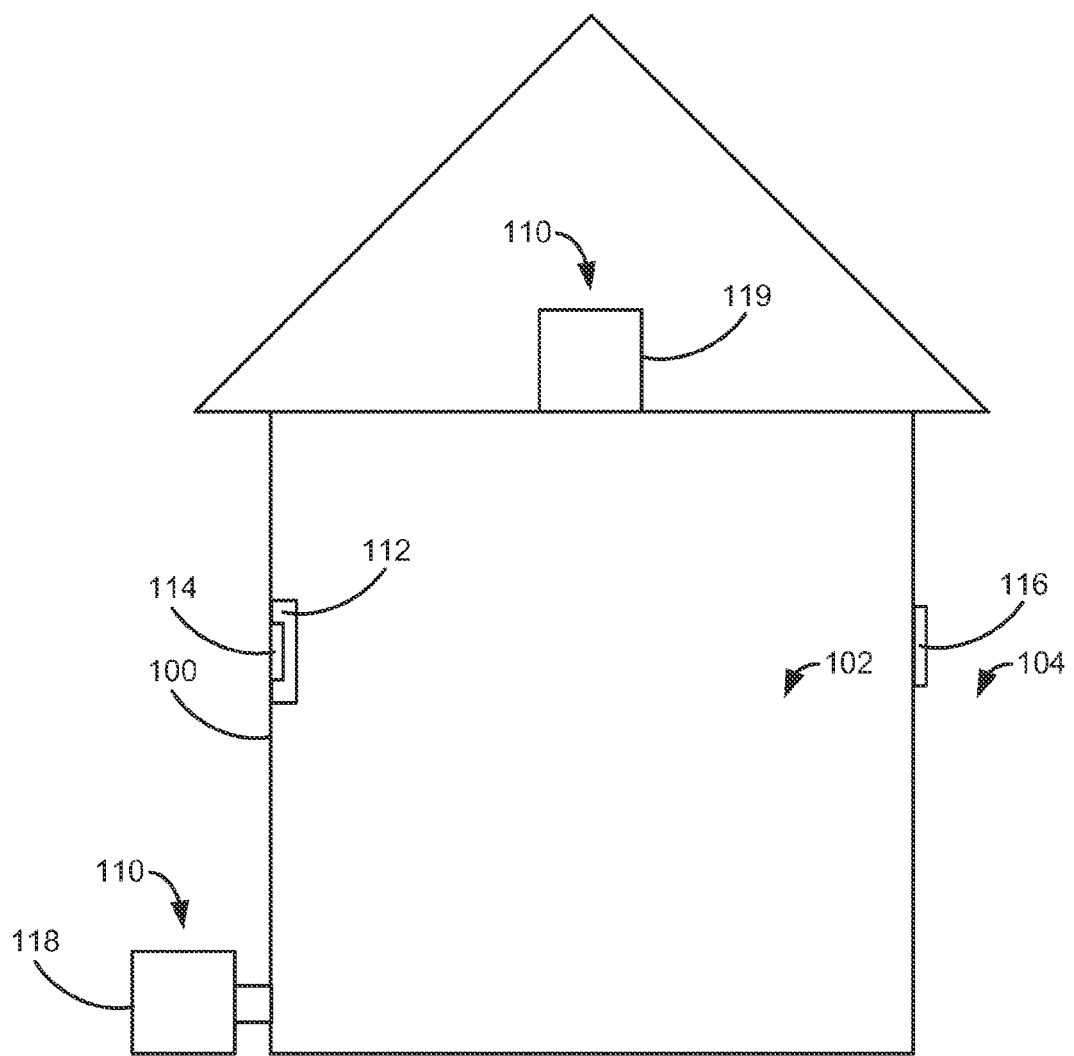
FIG. 1 provides a schematic representation of an exemplary building as may be used with the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic representation of an exemplary building 100 as may be used with the present subject matter. Building 100 includes an HVAC system 110. HVAC system 110 is configured for providing heated air to building 100, providing cooled air to building 100, or both. In particular, building 100 defines an inside or interior 102. Interior 102 of building 100 is separated or segregated from an exterior or outside 104. HVAC system 110 can heat and/or cool interior 102 of building 100.

As will be understood by those skilled in the art, HVAC system 110 can be any suitable mechanism for heating and/or cooling interior 102 of building 100. In the exemplary embodiment shown in FIG. 1, HVAC system 110 includes an air treatment component 118 for heating and/or cooling air and at least one blower 119 for directing heated and/or cooled air into interior 102 of building 100, e.g., via a duct system within building 100. As an example, air treatment component 118 can be a heat pump that provides for both heating and cooling of the air circulated by blower 119 of HVAC system 110. Alternatively, air treatment component 118 of HVAC system 110 can be a heater based on e.g., one or more gas burners or electric strips.

HVAC system 110 also includes a thermostat 112 for controlling HVAC system 110 and measuring a temperature of interior 102. A user can set an operating temperature of HVAC system 110 with thermostat 112, and HVAC system 110 can operate to maintain interior 102 of building 100 at the operating temperature. Further, HVAC system 110 includes a temperature sensor 116, such as a thermocouple or thermistor, for measuring a temperature of exterior 104 of building 100.

HVAC system 110 also includes a processing device or controller 114, e.g., positioned within thermostat 112. Various operational processes or methods for operating HVAC system 110 can be programmed into controller 114. As used herein, "controller" may include a memory and one or more microprocessors, CPUs or the like, such as general or special purpose microprocessors operable to execute programming instructions or micro-control code associated with operation of HVAC system 110. The memory may represent random access memory such as DRAM, or read only memory such as ROM or FLASH. In one embodiment, the processor executes programming instructions stored in memory. The memory may be a separate component from the processor or may be included onboard within the processor.

It should be understood that the shape and configuration of building 100 shown in FIG. 1 is provided by way of example only. Buildings having different shapes, configurations, different numbers of rooms, hallways, etc.—both residential and commercial—may be used with the present subject matter. Further, the location of HVAC system 110 relative to building 100 is also provided by way of example only.

HVAC system 110 consumes energy to heat and/or cool interior 102 of building 100. As discussed in greater detail below, the present subject matter provides methods for operating an HVAC system, such as HVAC system 110. Such methods can assist with more efficiently and/or cheaply operating HVAC system 110 to heat and/or cool interior 102 of building 100.

Figure 2:
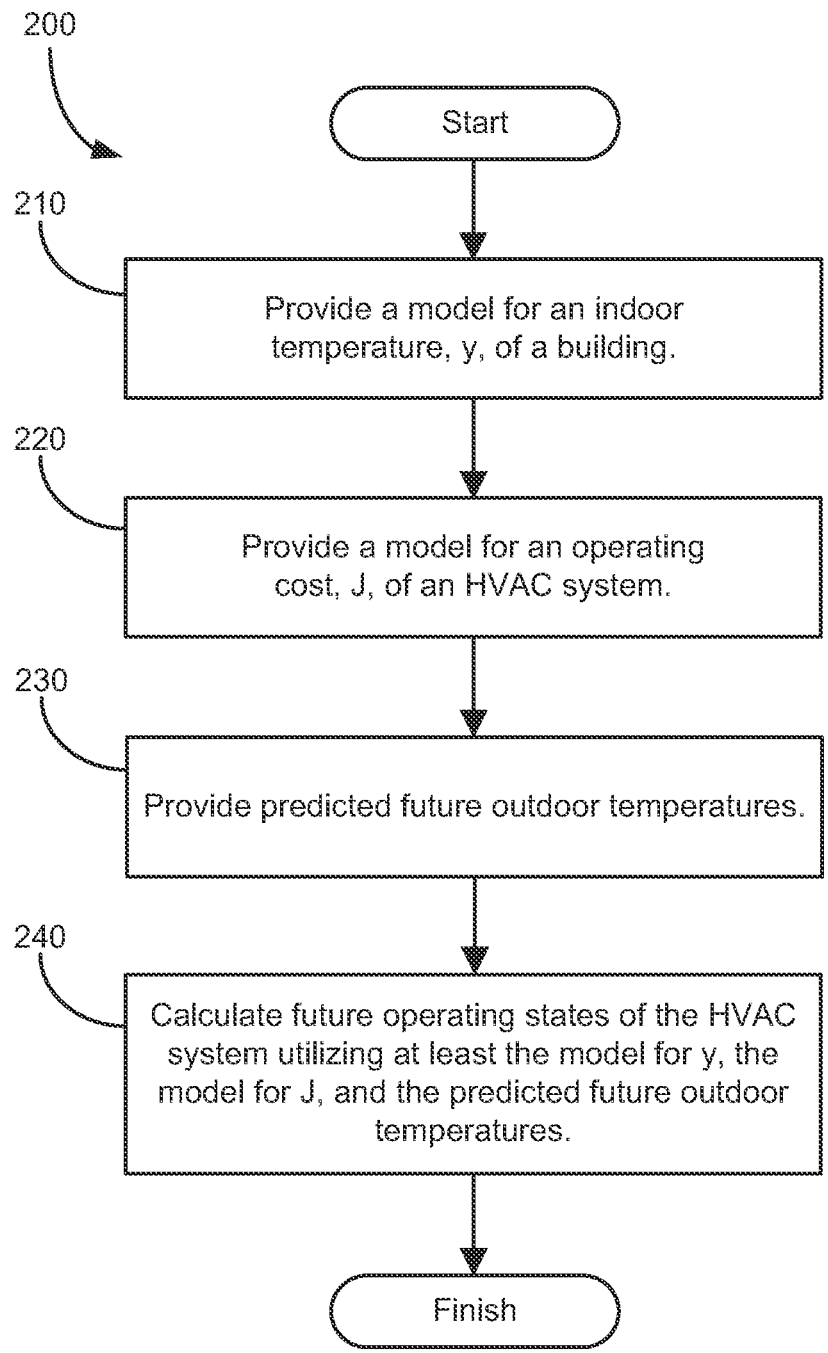
FIG. 2 illustrates a method for operating an HVAC system according to an exemplary embodiment of the present subject matter.

FIG. 2 illustrates a method 200 for operating an HVAC system according to an exemplary embodiment of the present subject matter. Method 200 can be used to operate any suitable HVAC system, such as HVAC system 110 (FIG. 1). As an example, controller 114 of HVAC system 110 can be programmed to implement method 200. Utilizing method 200, future operating states of HVAC system 110 can be calculated, e.g., such that HVAC system 110 operates more efficiently and/or cheaply.

At step 210, a model for an indoor temperature, y, of building 100 is provided. The model for y can be programmed into controller 114 such that controller 114 can calculate a predicted future indoor temperature of building 100, e.g., a predicted future temperature of interior 102. The model for y can utilize any suitable input to calculate y. For example, y can be calculated based at least in part upon a previous indoor temperature of building 100, a previous outdoor temperature of building 100, and/or a previous operational state of HVAC system 110, e.g., whether HVAC system 110 is on or off.

The model for y can be any suitable model for simulating or modeling the heat dynamics of building 100. As an example, the model for y can be a second order linear model, e.g., such that the model for y is given as $$y_k = a_1 y_{k-1} + a_2 y_{k-2} + b_1 v_{k-1} + b_2 u_{k-1}$$

where $y_k$ is an indoor temperature of building 100 at time k,
$y_{k-1}$ is an indoor temperature of building 100 at time k−1,
$y_{k-2}$ is an indoor temperature of building 100 at time k−2,
$v_{k-1}$ is an outdoor temperature at time k−1,
$u_{k-1}$ is an operating state of HVAC system 110 at time k−1, and
$a_1$, $a_2$, $b_1$, and $b_2$ are constants.

As will be understood by those skilled in the art, the model for y provided above is a discrete-time auto-regressive model with exogenous inputs, and constants $a_1$, $a_2$, $b_1$, and $b_2$ can be determined utilizing recursive least-square techniques or any other suitable technique. As an example, controller 114 can receive indoor temperature measurements from thermostat 112, outdoor temperature measurements from temperature sensor 116, and operating states from HVAC system 110 over time and calculate constants $a_1$, $a_2$, $b_1$, and $b_2$ in order to identify the model for y.

The model for y provided above can also be provided as a state space model. Thus, the model for y can be given as $$X_{k+1} = AX_k + BU_k$$

where $X_k = [y_k y_{k-1}]^T$, and $U_k = [v_k u_k]^T$.

As discussed above, the model for y can be any suitable model in alternative exemplary embodiments. Thus, the model provided above is not intended to limit the present subject matter in any aspect and is provided by way of example only.

At step 220, a model for an operating cost, J, of HVAC system 110 is provided. The model for J can be programmed into controller 114 such that controller 114 can calculate future operating costs of HVAC system 110. The model for J can utilize any suitable inputs. For example, the model for J can be based at least in part on a utility cost of HVAC system 110, a comfort cost of HVAC system 110, and a state change cost of HVAC system 110.

The model for J can be any suitable model. As an example, the model for J can be given as $$J(X_0) = J_e + J_d + J_p$$

where $J(X_0)$ is the total cost of operating HVAC system 110;
$J_e$ is the utility cost of HVAC system 110,
$J_d$ is the comfort cost of HVAC system 110, and
$J_p$ is the state change cost of HVAC system 110.

Thus, the model for J can include summing the utility cost, the comfort cost, and the state change cost of HVAC system 110 in order to calculate the total cost of operating HVAC system 110. By incorporating, the comfort cost and the state change cost of HVAC system 110 into the total cost of operating HVAC system 110, the model for J can reduce externalities associated with operating HVAC system 110. As discussed above, the model for J can be any suitable model in alternative exemplary embodiments. Thus, the model provided above is not intended to limit the present subject matter in any aspect and is provided by way of example only.

In the model for J provided above, the utility cost of HVAC system 110 can be calculated using the following:

$$J_e = \sum_{k=0}^{N-1} u_k g(k)$$

where $u_k$ is the operating state of HVAC system 110 at time k, and
g(k) is a unit price for energy at time k.

Thus, the utility cost of HVAC system 110 can correspond to the cost of energy required to operate HVAC system 110 over a period of time from k=0 to k=N−1.

In the model for J provided above, the comfort cost of HVAC system 110 can be calculated using the following:

$$J_d = \sum_{k=0}^{N-1} d(y_k - r_k)^2 + d(y_N - r_N)^2$$

where d is a constant greater than zero,
$y_k$ is the indoor temperature of building 100 at time k,
$r_k$ is a user selected temperature at time k,
$y_N$ is the indoor temperature of building 100 at a terminal time N, and
$r_N$ is the user selected temperature at the terminal time N.

A user of HVAC system 110 can select $r_k$ at each point during the period of time from k=0 to k=N−1, and each $r_k$ can correspond to a reference temperature at which the user would like interior 102 of building 100 to be maintained by HVAC system 110. Thus, the comfort cost of HVAC system 110 can correspond to a cost or penalty paid when $y_k$ is different than $r_k$, e.g., when the actual temperature of interior 102 of building 100 is different than the temperature selected by the user for HVAC system 110 to heat and/or cool interior 102 of building 100. For example, the comfort cost of HVAC system 110 can be high when $y_k$ is significantly different than $r_k$, the comfort cost of HVAC system 110 can be lower when $y_k$ is about $r_k$, and the comfort cost of HVAC system 110 can be zero when $y_k$ is equal to $r_k$.

In the model for J provided above, the state change cost of HVAC system 110 can be calculated using the following:

$$J_p = \sum_{k=1}^{N-1} p(u_k, u_{k-1}) \text{ where } p(u_k, u_{k-1}) = \begin{cases} w_p & \text{if } u_k \neq u_{k-1} \\ 0 & \text{if } u_k = u_{k-1} \end{cases}$$

$u_k$ is the operating state of HVAC system 110 at time k,
$u_{k-1}$ is the operating state of HVAC system 110 at time k−1, and
$w_p$ is the cost of changing the operating state of HVAC system 110.

Thus, the state change cost of HVAC system 110 can correspond to a penalty or cost imposed when HVAC system 110 switches operating states, e.g., when HVAC system 110 switches between on and off states. By imposing the state change cost, frequent operating state changes by HVAC system 110 can be avoided or discouraged.

At step 230, predicted future outdoor temperatures are provided. As an example, controller 114 can receive the predicted future outdoor temperatures, e.g., predicted future temperatures of exterior 104 of building 100, at step 230. The predicted future outdoor temperatures can come from any suitable source. For example, the predicted future outdoor temperatures can be based on weather forecast data or historical weather data.

As an example, weather forecast data generally includes a daily maximum temperature and a daily minimum temperature. Further, outdoor temperatures generally have a sinusoidal shape between the daily maximum temperature and the daily minimum temperature. Thus, the predicted future outdoor temperatures can be provided using the following:

$$f(t) = \begin{cases} \dfrac{T_{max}(k) + T_{min}(k)}{2} - \dfrac{T_{max}(k) - T_{min}(k)}{2} \\ \quad \cos\left(\dfrac{\pi(t - t_{min}(k))}{t_{max}(k) - t_{min}(k)}\right) & t \in [t_{min}(k), t_{max}(k)) \\ \dfrac{T_{max}(k) + T_{min}(k+1)}{2} + \dfrac{T_{max}(k) - T_{min}(k+1)}{2} \\ \quad \cos\left(\dfrac{\pi(t - t_{max}(k))}{t_{min}(k+1) - t_{max}(k)}\right) & t \in [t_{max}(k), t_{min}(k+1)) \end{cases}$$

where $T_{max}(k)$ is a maximum temperature on day k,
$T_{min}(k)$ is a minimum temperature on day k,
$t_{max}(k)$ is a time of day for $T_{max}(k)$, and
$t_{min}(k)$ is a time of day for $T_{min}(k)$.

Utilizing the above formula, the predicted future outdoor temperatures can be provided throughout the day despite only having the daily maximum temperature and the daily minimum temperature from the weather forecast data. As discussed above, the predicted future outdoor temperatures can be determined in any suitable manner. Thus, the formula provided above is provided by way of example only and is not intended to limit the present subject matter.

At step 240, controller 114 calculates future operating states of HVAC system 110 utilizing at least the model for y, the model for J, and the predicted future outdoor temperatures. Each future operating state the HVAC system 110 can correspond to or be used to determine whether HVAC system 110 is on or off, e.g., whether air treatment component 118 of HVAC system 110 is heating and/or cooling air or not heating and/or cooling air and/or whether blower 119 of HVAC system 110 is moving air or not moving air. Thus, the future operating states of HVAC system 110 can be used to program or schedule operations of HVAC system 110. For example, controller 114 can be programmed to operate HVAC system 110 according to the future operating states of HVAC system 110 calculated at step 240.

The future operating states of HVAC system 110 can be calculated at step 240 in order to minimize future operating costs of HVAC system 110. In order to minimize future operating costs of HVAC system 110 at step 240, the future operating states of HVAC system 110 can calculated using the following:

$$J_N(X_N, U_{N-1}) = d(y_N - r_N)^2 \text{ and}$$

$$J_k(X_k, U_{k-1}) =$$

-continued $$\min_{u_k} u_k g(k) + d(y_k - r_k)^2 + p(u_k, u_{k-1}) + J_{k+1}(AX_k + BU_k, U_k)$$

where
d is the constant greater than zero,
$y_N$ is the indoor temperature of building 100 at the terminal time N.,
$r_N$ is the user selected temperature at the terminal time N,
$u_k$ is the operating state of HVAC system 110 at time k,
g(k) is the unit price for energy at time k,
$y_k$ is the indoor temperature of building 100 at time k,
$r_k$ is the user selected temperature at time k, $$p(u_k, u_{k-1}) = \begin{cases} w_p & \text{if } u_k \neq u_{k-1} \\ 0 & \text{if } u_k = u_{k-1}, \end{cases}$$

$u_k$ is the operating state of HVAC system 110 at time k,
$u_{k-1}$ is the operating state of HVAC system 110 at time k−1, and
$w_p$ is the cost of changing the operating state of HVAC system 110.

By minimizing future operating costs of HVAC system 110, method 200 can assist with operating HVAC system 110 more efficiently and/or cheaply relative to other control logics or methods for operating HVAC system 110 as discussed in greater detail below.

As an example, HVAC system 110 can be programmed to operate such that HVAC system 110 maintains interior 102 of building 100 at a predetermined temperature. In particular, HVAC system 110 can be programmed to operate in the following manner:

$$u_k = \begin{cases} 1 & \text{if } u_{k-1} = 0, y_{k-1} < L_{k-1} \\ 1 & \text{if } u_{k-1} = 1, y_{k-1} < H_{k-1} \\ 0 & \text{otherwise} \end{cases}$$

where
$u_{k-1}$ is an operating state of HVAC system 110 at time k−1,
$y_{k-1}$ is an indoor temperature of building 100 at time k−1,
$L_{k-1}$ is a low set temperature of HVAC system 110 at time k−1, and
$H_{k-1}$ is a high set temperature of HVAC system 110 at time k−1.

In the control model shown above, HVAC system 110 is on or heating and/or cooling air when $u_k=1$. Conversely, HVAC system 110 is off or not heating and/or cooling air when $u_k=0$. Using the above control logic, operation of HVAC system 110 is solely determined by the set temperatures selected by the user. Utilizing method 200, operation of HVAC system 110 is determined at least in part by the cost of operating HVAC system 110, and HVAC system 110 can operate in a cheaper and/or more efficient manner by selecting suitable future operating states of HVAC system 110, e.g., to minimize the operating cost of HVAC system 110.

In additional exemplary embodiments, the user of HVAC system 110 can adjust the reference temperatures, $r_k$, and/or the constant d for the comfort cost of HVAC system 110 in order to shift or adjust the comfort cost of HVAC system 110. Similarly, the user of HVAC system 110 can adjust the cost of changing the operating state, $w_p$, of HVAC system 110 for the state change cost in order to shift or adjust the state change cost of HVAC system 110. In such a manner, the user can adjust the balance or trade-off between the various costs associated with operating HVAC system 110 and, e.g., adjust the calculation of future operating states of HVAC system 110 at step 240. For example, if the user is too uncomfortable, the user can increase the value of d in order to increase $J_d$ relative to $J_e$ and $J_c$. Similarly, if the user desires more infrequent state changes for HVAC system 110, the user can increase a value of $w_p$ in order to increase $J_c$ relative to $J_e$ and $J_d$.

Figure 3:
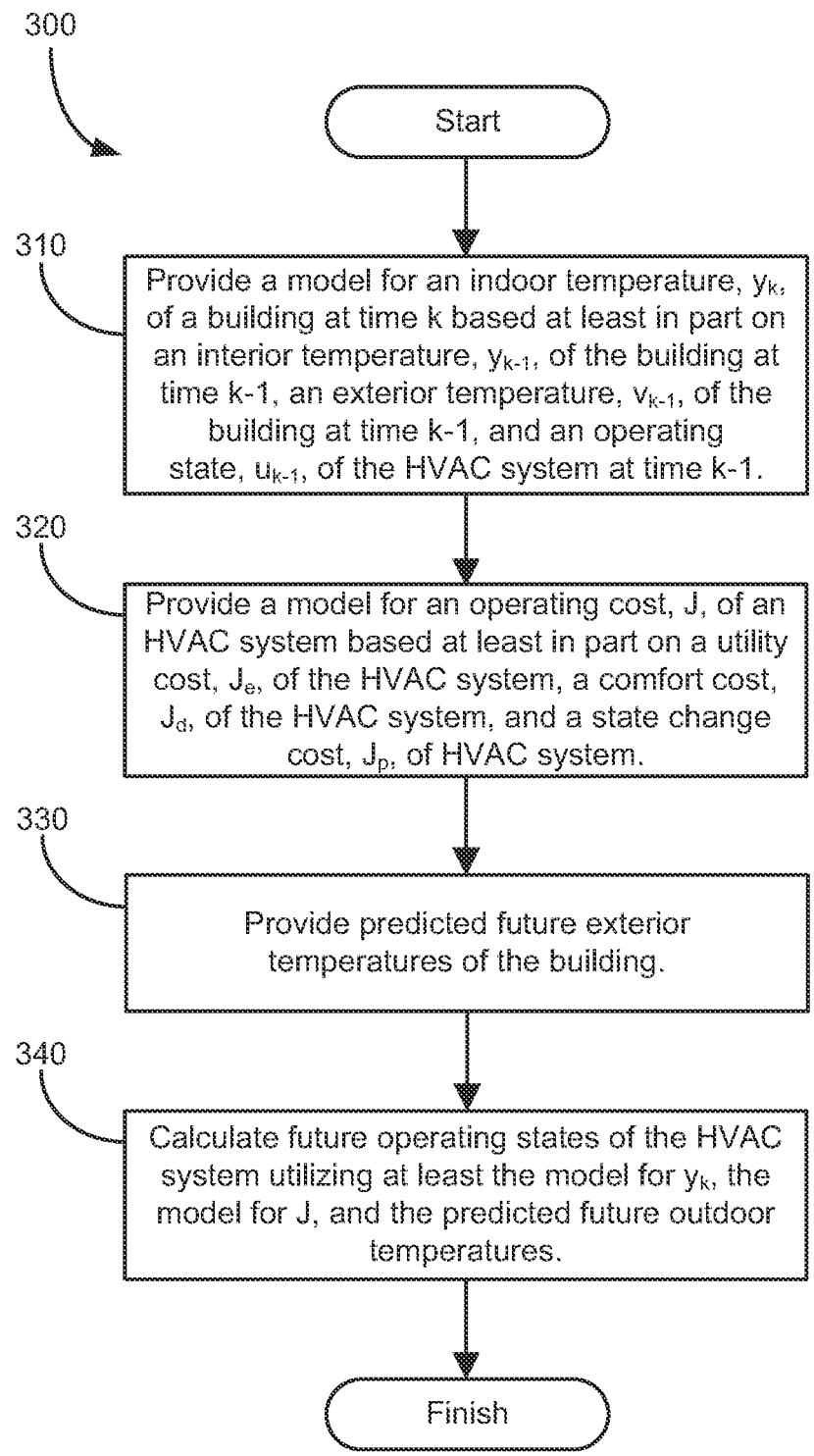
FIG. 3 illustrates a method for operating an HVAC system according to an additional exemplary embodiment of the present subject matter.

FIG. 3 illustrates a method 300 for operating an HVAC system according to an exemplary embodiment of the present subject matter. Method 300 can be used to operate any suitable HVAC system, such as HVAC system 110 (FIG. 1). As an example, controller 114 of HVAC system 110 can be programmed to implement method 300. Utilizing method 300, future operating states of HVAC system 110 can be calculated, e.g., such that HVAC system 110 operates more efficiently and/or cheaply. Method 300 is similar to method 200 and is discussed in light of the description of method 200 above.

At step 310, a model for an indoor temperature, $y_k$, of building 100 at time k based at least in part on an interior temperature, $y_{k-1}$, of building 100 at time k−1, an exterior temperature, $v_{k-1}$, of building 100 at time k−1, and an operating state, $u_{k-1}$, of HVAC system 110 at time k−1 is provided. The model for y can be any suitable model. As an example, the model for y can be a second order linear model, e.g., such that the model for y is given as $$y_k = a_1 y_{k-1} + a_2 y_{k-2} + b_1 v_{k-1} + b_2 u_{k-1}$$

and described above.

At step 320, a model for an operating cost, J, of HVAC system 110 is provided. The model for J is based at least in part on a utility cost, $J_e$, of HVAC system 110, a comfort cost, $J_d$, of HVAC system 110, and a state change cost, $J_p$, of HVAC system 110. The model for J can be any suitable model. As an example, the model for J can be given as $$J(X_0) = J_e + J_d + J_p$$

and described above.

At step 330, predicted future exterior temperatures of building 100 are provided. As an example, controller 114 can receive the predicted future exterior temperatures of building 100 at step 330. The predicted future exterior temperatures of building 100 can come from any suitable source. For example, the predicted future exterior temperatures of building 100 can be based upon weather forecast data or historical weather data.

At step 340, future operating states of HVAC system 110 are calculated. The future operating states of HVAC system 110 can be calculated utilizing at least the model for $y_k$, the model for J, and the predicted future outdoor temperatures. The future operating states of HVAC system 110 can be calculated using the following, $$J_N(X_N, U_{N-1}) = d(y_N - r_N)^2 \text{ and}$$

$$J_k(X_k, U_{k-1}) =$$
$$\min_{u_k} u_k g(k) + d(y_k - r_k)^2 + p(u_k, u_{k-1}) + J_{k+1}(AX_k + BU_k, U_k)$$

described above. Thus, the future operating states of HVAC system 110 can be minimized in order to operate HVAC system 110 more efficiently and/or cheaply.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an HVAC system, the HVAC system configured for cooling air within a building, heating air within the building, or both, the method comprising:
providing a model for an indoor temperature, y, of the building, the model for y comprising $$y_k = a_{k-1} + a_2 y_{k-2} + b_1 v_{k-1} + b_2 u_{k-1}$$

where
$y_k$ is an indoor temperature of the building at time k,
$y_{k-1}$ is an indoor temperature of the building at time k-1,
$y_{k-2}$ is an indoor temperature of the building at time k-2,
$v_{k-1}$ is an outdoor temperature at time k-1,
$u_{k-1}$ is an operating state of the HVAC system at time k-1, and
$a_1, a_2, b_1$, and $b_2$ are constants;
providing predicted future outdoor temperatures;
calculating future operating states of the HVAC system with a controller of the HVAC system utilizing at least the model for y, the model for J, and the predicted future outdoor temperatures; and
activating the HVAC system during the future operating states of the HVAC system from said step of calculating.

2. The method of claim 1, wherein said step of providing the model for J comprises providing the model for J based at least in part on a utility cost of the HVAC system, a comfort cost of the HVAC system, and a state change cost of the HVAC system.

3. The method of claim 2, wherein the model for J comprises $$J(X_0) = J_e + J_d + J_p$$

where
$J(X_0)$ is a total cost of operating the HVAC system;
$J_e$ is the utility cost of the HVAC system,
$J_d$ is the comfort cost of the HVAC system, and
$J_p$ is the state change cost of the HVAC system.

4. The method of claim 3, wherein the utility cost of the HVAC system is determined with the following:

$$J_e = \sum_{k=0}^{N-1} u_k g(k)$$

where
$u_k$ is the operating state of the HVAC system at time k, and
$g(k)$ is a unit price for energy at time k.

5. The method of claim 3, wherein the comfort cost of the HVAC system is determined with the following:

$$J_d = \sum_{k=0}^{N-1} d(y_k - r_k)^2 + d(y_N - r_N)^2$$

where
d is a constant greater than zero,
$y_k$ is the indoor temperature of the building at time k,
$r_k$ is a user selected temperature at time k,
$y_N$ is the indoor temperature of the building at a terminal time N, and
$r_N$ is the user selected temperature at the terminal time N.

6. The method of claim 3, wherein the state change cost of the HVAC system is determined with the following:

$$J_p = \sum_{k=1}^{N-1} p(u_k, u_{k-1}) \text{ where } p(u_k, u_{k-1}) = \begin{cases} w_p & \text{if } u_k \neq u_{k-1} \\ 0 & \text{if } u_k = u_{k-1} \end{cases}$$

$u_k$ is the operating state of the HVAC system at time k,
$u_{k-1}$ is the operating state of the HVAC system at time k-1, and
$w_p$ is the cost of changing the operating state of the HVAC system.

7. The method of claim 1, wherein said step of calculating future operating states of the HVAC system comprises calculating future operating states of the HVAC system in order to minimize future operating costs of the HVAC system.

8. The method of claim 7, wherein said step of calculating future operating states of the HVAC system comprises calculating future operating states of the HVAC system with the following:

$$J_N(X_N, U_{N-1}) = d(y_N - r_N)^2 \text{ and}$$

$$J_k(X_k, U_{k-1}) = \min_{u_k} u_k g(k) + d(y_k - r_k)^2 + p(u_k, u_{k-1}) + J_{k+1}(AX_k + BU_k, U_k)$$

where
d is a constant greater than zero,
$y_N$ is the indoor temperature of the building at a terminal time N,
$r_N$ is the user selected temperature at the terminal time N,
$u_k$ is the operating state of the HVAC system at time k,
$g(k)$ is a unit price for energy at time k,
$y_k$ is the indoor temperature of the building at time k,
$r_k$ is a user selected temperature at time k, $$p(u_k, u_{k-1}) = \begin{cases} w_p & \text{if } u_k \neq u_{k-1} \\ 0 & \text{if } u_k = u_{k-1}, \end{cases}$$

$u_k$ is the operating state of the HVAC system at time k,
$u_{k-1}$ is the operating state of the HVAC system at time k-1, and
$w_p$ is the cost of changing the operating state of the HVAC system.

9. The method of claim 1, wherein said step of providing predicted future outdoor temperatures comprises determining predicted future outdoor temperatures based upon weather forecast data.

10. A method for operating an HVAC system, the HVAC system configured for cooling air within a building, heating air within the building, or both, the method comprising:

providing a model for an indoor temperature, $y_k$, of the building at time k based at least in part on an interior temperature, $y_{k-1}$, of the building at time k−1, an exterior temperature, $v_{k-1}$, of the building at time k−1, and an operating state, $u_{k-1}$, of the HVAC system at time k−1;

providing a model for an operating cost, J, of the HVAC system based at least in part on a utility cost, $J_e$, of the HVAC system, a comfort cost, $J_d$, of the HVAC system, and a state change cost, $J_p$, of the HVAC system, $J_e$ being determined with the following:

$$J_e = \sum_{k=0}^{N-1} u_k g(k)$$

where
$u_k$ is the operating state of the HVAC system at time k, and
g(k) is a unit price for energy at time k;

providing predicted future outdoor temperatures;

calculating future operating states of the HVAC system with a controller of the HVAC system utilizing at least the model for $y_k$, the model for J, and the predicted future outdoor temperatures; and activating the HVAC system during the future operating states of the HVAC system from said step of calculating.

11. The method of claim 10, wherein said step of calculating future operating states of the HVAC system comprises calculating future operating states of the HVAC system in order to minimize future operating costs of the HVAC system.

12. The method of claim 10, wherein $J_d$ is determined with the following:

$$J_d = \sum_{k=0}^{N-1} d(y_k - r_k)^2 + d(y_N - r_N)^2$$

where
d is a constant greater than zero,
$y_k$ is the indoor temperature of the building at time k,
$r_k$ is a user selected temperature at time k,
$y_N$ is the indoor temperature of the building at a terminal time N, and
$r_N$ is the user selected temperature at the terminal time N.

13. The method of claim 10, wherein $J_p$ is determined with the following:

$$J_p = \sum_{k=1}^{N-1} p(u_k, u_{k-1}) \text{ where } p(u_k, u_{k-1}) = \begin{cases} w_p & \text{if } u_k \neq u_{k-1} \\ 0 & \text{if } u_k = u_{k-1} \end{cases}$$

$u_k$ is the operating state of the HVAC system at time k, $u_{k-1}$ is the operating state of the HVAC system at time k−1, and $w_p$ is the cost of changing the operating state of the HVAC system.

14. The method of claim 10, wherein said step of calculating future operating states of the HVAC system comprises calculating the future operating states of the HVAC system with the following:

$$J_N(X_N, U_{N-1}) = d(y_N - r_N)^2$$

$$J_k(X_k, U_{k-1}) = \min_{u_k} u_k g(k) + d(y_k - r_k)^2 + p(u_k, u_{k-1}) + J_{k+1}(AX_k + BU_k, U_k)$$

where
d is a constant greater than zero,
$y_N$ is the indoor temperature of the building at a terminal time N,
$r_N$ is the user selected temperature at the terminal time N,
$u_k$ is the operating state of the HVAC system at time k,
g(k) is a unit price for energy at time k,
$y_k$ is the indoor temperature of the building at time k,
$r_k$ is a user selected temperature at time k, $$p(u_k, u_{k-1}) = \begin{cases} w_p & \text{if } u_k \neq u_{k-1} \\ 0 & \text{if } u_k = u_{k-1}, \end{cases}$$

$u_k$ is the operating state of the HVAC system at time k,
$u_{k-1}$ is the operating state of the HVAC system at time k−1, and
$w_p$ is the cost of changing the operating state of the HVAC system.

15. The method of claim 10, wherein the model for y comprises $$y_k = a_1 y_{k-1} + a_2 y_{k-2} + b_1 v_{k-1} + b_2 u_{k-1}$$

where
$y_k$ is an indoor temperature of the building at time k,
$y_{k-1}$ is an indoor temperature of the building at time k−1,
$y_{k-2}$ is an indoor temperature of the building at time k−2,
$v_{k-1}$ is an outdoor temperature at time k−1,
$u_{k-1}$ is an operating state of the HVAC system at time k−1, and
$a_1$, $a_2$, $b_1$, and $b_2$ are constants.

16. The method of claim 10, wherein said step of providing predicted future outdoor temperatures comprises determining predicted future outdoor temperatures based upon weather forecast data.

* * * * *